United States Patent [19]

Listenberger

[11] Patent Number: 5,421,457
[45] Date of Patent: Jun. 6, 1995

[54] CORD BUCKET

[76] Inventor: Paul A. Listenberger, 2260 Kearney Ave., Naples, Fla. 33964

[21] Appl. No.: 260,414

[22] Filed: Jun. 14, 1994

[51] Int. Cl.$^6$ .................................... B65D 85/04
[52] U.S. Cl. ............................ 206/388; 206/328; 206/329; 174/50
[58] Field of Search ............... 174/235; 206/328–334, 206/388

[56] References Cited

U.S. PATENT DOCUMENTS

| | | | |
|---|---|---|---|
| 2,449,464 | 9/1948 | Eypper | 174/135 |
| 2,582,787 | 1/1952 | Martin | 206/328 |
| 2,763,707 | 9/1956 | Soderberg | 206/328 |
| 3,089,210 | 5/1963 | Ritter | 174/135 |
| 3,337,682 | 8/1967 | Swett | 174/135 |
| 4,475,649 | 10/1984 | Haarbosch | 174/135 |
| 4,984,685 | 1/1991 | Douglas | 206/328 |
| 5,029,704 | 7/1991 | Stillinger | 174/135 |
| 5,103,977 | 4/1992 | Douglas | 206/388 |

Primary Examiner—Jimmy G. Foster
Attorney, Agent, or Firm—Michael I. Kroll

[57] ABSTRACT

A bucket shaped container is provided for transporting, storing, and dispensing electrical extension cords or other elongated filament materials. The container has a pivoted carrying handle. A cone shaped dispensing top is designed to prevent moisture from entering and drain holes are provided to dry the interior. The pivoted handle, similar to a paint can is fitted with a rubberized grip for carrying ease. Both ends of the cord are accessible at all times with one end emerging from the cone shaped top and the other emerging through a slot on the side. Both openings frictionally engage the cord to hold it at any temporary extended length.

3 Claims, 2 Drawing Sheets

CORD BUCKET

CROSS REFERENCE TO RELATED DISCLOSURE DOCUMENT

This invention was disclosed in Information Disclosure Document No. 336,590, filed with the United States Patent and Trademark Office on Aug. 2, 1993.

BACKGROUND OF THE INVENTION

1. Field of the Invention

The present invention relates to a portable container for storing and dispensing elongated elements such as electrical cord. More specifically, it relates to an improved all-weather cord storage device having provision to minimize the entry of rain water and to drain any water which may enter the device. More generally, however, the device may be used for dispensing of any sort of flexible rope, cord, line, filament, or conduit. The dispenser itself consists of modifications easily made to existing bucket type containers. This makes it useful for both a packaging and shipping carton as well as a dispenser. When used in this manner the entire device is inexpensive enough to be discarded after the package contents have been dispensed.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for deploying and automatically retracting elelctrical cord, garden hoses, and the like are old and well known in the art. Many such devices, often called cord or hose caddies, are relatively complex and often more expensive than the conduit they are designed to handle. The caddy itself is also often bulky and heavy, thus not being easily portable. Recently, relatively cheap disposable plastic bucket containers have been developed and introduced into the marketplace in many different sizes. The present invention capitalizes upon the relative abundance of such containers and provides an effective means of recycling them for a lifetime of useful service as a line storage and dispensing device.

Anyone that has ever used a long electric extension cord understands the difficulty in not only unwinding the cord for use, but also in rewinding the cord for storage purposes. Because such cords are difficult to keep under control, the cord becomes easily entangled as well, causing continuing problems in unwinding and rewinding the cord, as well as moving the cord form location to location.

Homeowners face such problems only infrequently. However, skilled workmen encounter such problems almost daily. In som instances workers have become so disenchanted with tangled cords that they have simply thrown the cords away rather than take the time and trouble to untangle the cord.

Another problem exists in storing extension cords. Homeowners can simply wind up the cord and hang it on various hooks in a garage or tool shed. While this is not so easily accomplished, it is a problem infrequently encountered by homeowners. Skilled workmen, on the other hand, have no convenient place to store such cords, either on the job site or in their vehicle. As can be easily imagined, winding a cord and placing it either on the floor of a job site or in a vehicle subjects the cord to unwinding, either from movement or from other workmen. Further, there is no assurance that such cords will not become entangled, either upon themselves or upon other products or articles.

One way such cord problems are overcome is to use a spring acting or return reel, sucha as employed in vacuum cleaners. The cord is pulled through a small opening for unwinding purposes and then a button is pushed to release a pawl/ratchet mechanism to enable a spring to rewind the cord on the return reel. Of course, such devices are extremely expensive because of the need to employ various pawl/ratchet mechanisms and springs. Another practical approach is simply to wind the cord on a reel. However, this does not meet the needs of skilled workmen and homeowners, as will become apparent.

Another common problem associated with enclosed caddies of the type discussed above is the accumulation of moisture within the conduit carrying container. This tends to be a more common problem for the skilled workman since he is often obligated to work outdoors in inclement weather. This moisture tends to corrode, rust, and promote mildew within the container with consequent detrimental effects to both the container and the conduit. My container is designed to keep moisture out and, if some should get in, to promote rapid drainage and drying.

The following known prior art has been directed to providing means for dispensing and storing electrical cord or garden hoses. As will be seen, the simplicity and effectiveness of my invention is not rivaled in the prior art.

U.S. Pat. No. 4,984,685, issued to Douglas on Jan. 15, 1991, shows a portable container for elongated elements. The container has a large hollow inner shaft about which a cord is wrapped. The large inner shaft portion may be used to store accessory items, but at the same time significantly reduces the volume available for storing cord. The ends of the cord both extend through openings in a complicated double lid. Separate clips are provided to anchor the ends of the cord. By contrast the present envention utilizes the entire volume of the container for cord storage, extends one end of the cord through the side of the container, and requires no separate clips to suitably anchor both ends of the cord.

U.S. Pat. No. 4,557,430, issued to Bonhard on Dec. 10, 1985, shows a power cord storage and dispenser. A complicated two part housing forms a winding reel for the cord sacrificing significant volume for cord storage. There is no provision for anchoring the cord. By contrast, the device of the instant invention requires no internal winding mechanism, may be completely filled with cord, and provides a simple cord exit slot which also serves as a cord anchor.

U.S. Pat. No. 5,011,034, issued to Abel on Apr. 30, 1991, shows a garden hose storing and concealing arrangement which resembles a bucket. The lid portion, recessed to contain plants, must be removed to access the hose. There is no guidance given the hose as it is replaced in the container and no carrying handle. By contrast, the device of the instant invention carries an elongated element such that both ends are always accessible, replaced conduit is guided to the center of the container. Also, the present invention provides a convenient pivoted carry handle.

U.S. Pat. No. 4,588,083, issued to Hunt on May 13, 1986, shows a garden hose storage container. The container has a central column, reducing the storage space, and a sealing cover, reducing hose access. The enclosed hose is not accessible except by opening the sealed cover. No handle is shown for transport. By contrast, the device of the instant invention has no volume consuming internal parts, provides continuous access to both ends of the enclosed conduit, and has a convenient carrying handle.

It is noted that none of the known prior art provides means for drainage and evaporation of excess moisture which may collect in the container as does my invention.

While some of these patents have overcome some of the problems noted above, they do not overcome all of the problems, and further, fall short in meeting the needs of skilled workmen and homeowners who are seeking a practical and economical portable container for storing and removing elongated elements, as well as rewinding such elements, without any of the problems noted above.

None of the above inventions and patents, taken either singly or in combination, is seen to describe the instant invention as claimed.

SUMMARY OF THE INVENTION

Briefly, the invention comprises a bucket shaped container with a carrying handle for transporting, storing, and dispensing electrical extension cords or other elongated filament materials. The cone shaped dispensing top is designed to prevent moisture from entering and drain holes are provided to dry the interior. A pivoted handle, similar to a paint can is provided for carrying ease. Both ends of the cord are accessible at all times with one end emerging from the cone shaped top and the other emerging through a slot on the side. Both openings frictionally engage the cord to hold it at any temporary extended length.

Accordingly, it is a principle object of the invention to provide a new and improved cord container and storage device which overcomes the disadvantages of the prior art in a simple but effective manner.

It is a major object of this invention to provide a cord container and storage device which is economical enough to be used as a shipping container for the enclosed cord and disposed of after the cord has been dispensed therefrom and consumed.

It is another object of the invention to provide a cord container and storage device which utilizes the entire enclosed volume for storage of cord.

It is another object of the invention to provide a cord container and storage device which has a pivoted carrying and hanging handle for portability of the container.

It is another object of the invention to provide a cord container and storage device which resists the entrance of moisture.

It is another object of the invention to provide a cord container and storage device which provides for evaporation and drainage of any moisture which inadvertantly gets inside.

It is yet another object of the invention to provide a cord container and storage device which may easily made from normally discarded plastic containers used to transport other material, thus providing a recycling benefit.

It is another object of the invention to provide a cord container and storage device which exposes and frictionally engages both ends of the enclosed cord so as to hold in position a predetermined payed out length of cord.

It is another object of the invention to provide a cord container and storage device which normally dispenses and stores the cord through a centrally located guide to minimize the possibility of entanglement.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
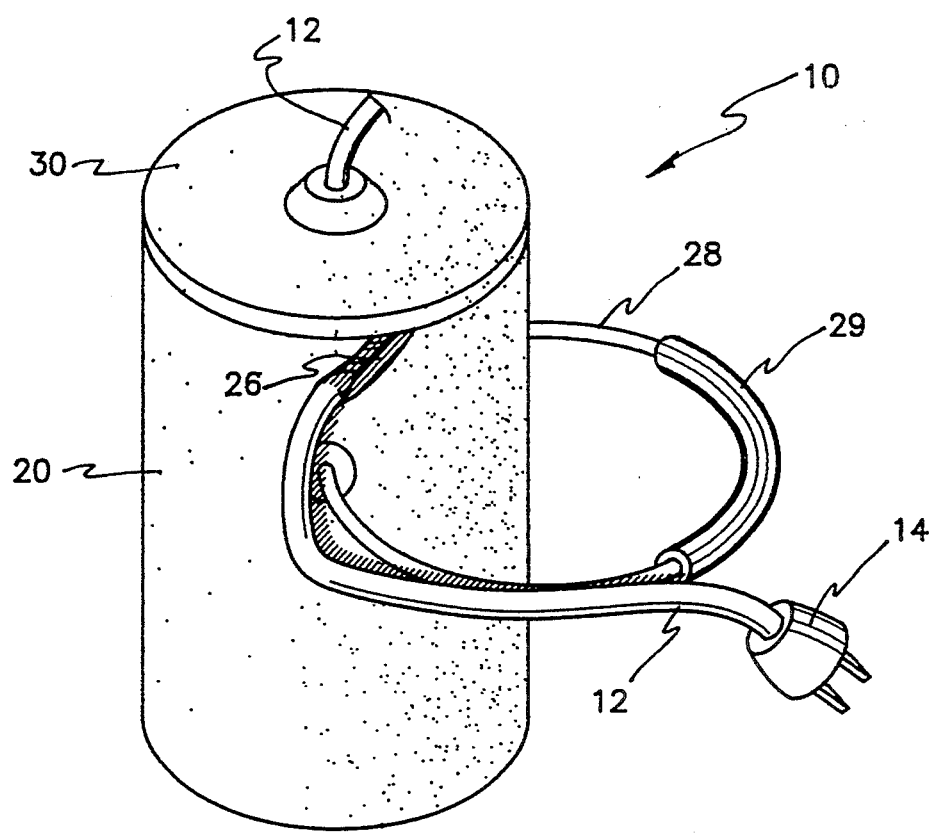
FIG. 1 is a perspective view of the inventive container showing the male portion of an enclosed electric cord exposed through a side and the other end of the cord exposed through the top, but broken away for clarity.

The cord dispensing and storage container of the present invention is generally designated by arrow 10 of FIG. 1. The device comprises the following main parts: cover 30, bucket 20, and handle 28.

The cord container 20 of FIG. 1 is seen to be a generally cylindrical bucket shaped object. The container, of course, could be conically shaped with the wide portion of the cone at the bottom for stability. The material used for bucket 20 may be discarded plastic buckets originally used for another purpose. It is also contemplated the bucket could be formed of expanded foam material for extreme lightness at the sacrifice of some durability. Ring handle 28 is pivoted at diametrically opposed side portions of the bucket near the top. The handle pivots are similar to the type commonly found on paint cans. Pivoted handle 28 is advantageous because it pivots out of the way when not in use, it is useful for carrying container 20, and it is useful for hanging the container on a hook. A pliable grip portion 29 is slipped around the outer portion of handle 28 to distribute the weight of the container over a greater area of the users hand when the bucket is carryied and to provide a frictional grip when the bucket is hung.

An angled slit 26 is cut downwardly from the top along one side of bucket 20 for frictionally gripping one end of cord 12 stored in the bucket. It is intended that the cord be easily pulled out of slit 26 for length adjustment and easily slipped back into the slit for relatively tight gripping of the cord in its longitudinal direction. It is contemplated that slit 26 could be a simple knive cut if the cord were relatively thin and the bucket walls were made of thin flexible material. On the other hand if the bucket walls were thick and relatively rigid, and the cord relatively fat, a cut might be formed in a sponge insert which is carried in a wider slit 26. In short there are many possible design variations for the frictional cord engaging slit which are well within the skill of an ordinary artisan. Such variations are intended to be within the scope of the claimed subject matter.

Figure 2:
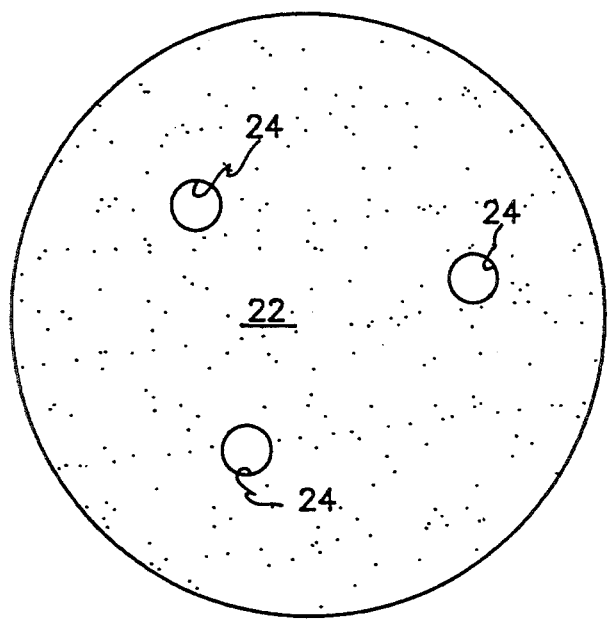
FIG. 2 is a bottom view of the container showing the drain holes in the bottom.

FIG. 2 is a view of bucket bottom 22 showing a series of drain holes 24. The purpose of the holes is to allow any liquid that collects in the container to easily drain and to allow dry air into the container to aid in evaporating any moisture which may condense on the inner bucket surfaces.

Figure 3:
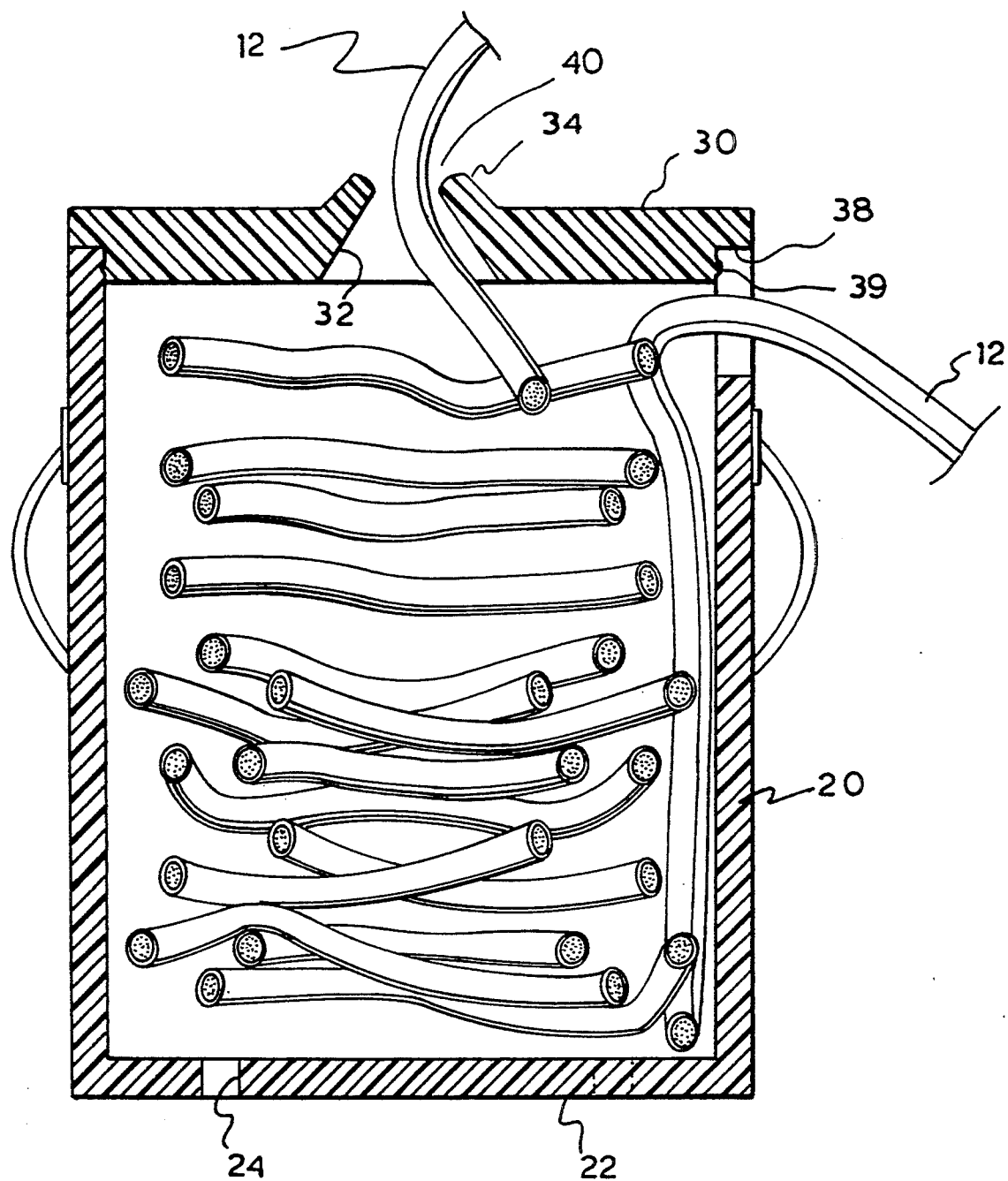
FIG. 3 is cross-sectional elevation view of the container and enclosed electric cord showing, in particular, the details of the sealed dispenser top portion.

Turning now to FIG. 3, the details of bucket top 30 will be described. Top 30 has annular stepped portion 38 which conjoins a wide diameter upper portion with a smaller diameter lower portion. The wide diameter is generally equal to the outside diameter of bucket 20 and the smaller diameter is generally equal to the inside diameter of bucket 20. A bulging ring 39 on top 30 snaps into a correspondint circular recess on the inner wall of bucket 20. The intent is to make a tight snap fitting seal between the bucket and the lid. Of course, the artisan will recognize many other variations for accomplishing the same purpose. Centrally located in lid 30 is a conical or dome shaped opening 32. Opening 32 serves as an outlet for the opposite end of electric cord 12. The upper surface of top 30 is also dome shaped as at 34 to promote the drainage of rain water. The dome shaped cord outlet is designed to accomplish much the same purpose as side slit 26 of FIG. 1. The dome is intended to frictional retard but not completely prevent the movement of cord 12 to or from the container. The artisan will recognize many equivalent ways of accomplishing the same function.

Cord is primarily pulled out from and fed into the bucket through aperture 40 and the central dome 32, 34. The side slit access to the other end of the cord is intended primarily to be used as a sort of a fixed distance holder to allow the bucket to be placed down relatively near an electrical outlet. Using the central dome as the primary entrance and exit guide point for the cord I have found the cord to be extremely easy to handle and transport as well as being tangle free. A list of reference numerals for the present invention follows:

| | |
|---|---|
| 10 | overall container |
| 12 | electric cord |
| 14 | male electric plug |
| 20 | bucket portion of container |
| 22 | container bottom |
| 24 | drainage holes |
| 26 | side slit |
| 28 | pivoted handle |
| 29 | handle grip |
| 30 | top portion of container |
| 32 | internal conical dome |
| 34 | external conical dome |
| 38 | annular step |
| 39 | bulging snap ring |
| 40 | aperture |

It is to be understood that the provided illustrative examples are by no means exhaustive of the many possible uses for my invention.

From the foregoing description, one skilled in the art can ascertain easily the essential characteristics of this invention and, without departing from the spirit and scope thereof, can make various changes and modifications of the invention to adapt it to various usages and conditions. For example, the artisan could easily determine that side slit 26 could be differently placed or that corners and edges could be appropriately beveled or rounded so as to ease cleaning and provide a different ornamental appearance.

It is to be understood that the present invention is not limited to the sole embodiment described above, but encompasses any and all embodiments within the scope of the following claims:

I claim:

1. A combined container and dispenser for cord material comprising;
   bucket means for holding a cord having two ends, said bucket means having a side opening for exposing one end of the cord, an open top, and a bottom with drain holes;
   top means tightly fitting into said open top of said bucket means and having central guide means for dispensing and receiving the other end of the cord;
   pivoted handle means for carrying or hanging said container.

2. The combined container and dispenser of claim 1, wherein
   said pivoted handle means includes a resilient grip means for easy carrying and friction assisted hanging.

3. The combined container and dispenser of claim 1, wherein;
   said central guide means includes means for frictionally engaging the cord and means for dispersing ambient water, and
   said side opening includes means for frictionally engaging the cord.

* * * * *